US012604936B2

(12) United States Patent
Lee

(10) Patent No.: US 12,604,936 B2
(45) Date of Patent: Apr. 21, 2026

(54) MASK GUIDE

(71) Applicant: Chan-Ho Lee, Gangneung-si (KR)

(72) Inventor: Chan-Ho Lee, Gangneung-si (KR)

( * ) Notice: Subject to any disclaimer, the term of this patent is extended or adjusted under 35 U.S.C. 154(b) by 604 days.

(21) Appl. No.: 18/087,293

(22) Filed: Dec. 22, 2022

(65) Prior Publication Data

US 2023/0248089 A1 Aug. 10, 2023

(30) Foreign Application Priority Data

Feb. 7, 2022 (KR) ........................ 10-2022-0015359

(51) Int. Cl.
*A41D 13/11* (2006.01)
*A62B 23/02* (2006.01)

(52) U.S. Cl.
CPC ...... *A41D 13/1161* (2013.01); *A41D 13/1169* (2013.01); *A62B 23/025* (2013.01)

(58) Field of Classification Search
CPC ....... A62B 23/00; A62B 23/02; A62B 23/025; A41D 13/11; A41D 13/1107; A41D 13/1115; A41D 13/1123; A41D 13/113; A41D 13/1138; A41D 13/1146; A41D 13/1153; A41D 13/1161; A41D 13/1169; A41D 13/1176; A41D 13/1184; A41D 13/1192
See application file for complete search history.

(56) References Cited

U.S. PATENT DOCUMENTS

2013/0213413 A1* 8/2013 Lai ..................... A41D 13/1161 128/863
2016/0037836 A1* 2/2016 Tuan .................. A41D 13/1161 128/863
2016/0058081 A1* 3/2016 Lee .................... A41D 13/1161 128/863
2021/0298387 A1* 9/2021 De La Guardia .. A41D 13/1161
2021/0360997 A1* 11/2021 Sutton ................ A41D 13/1146
2022/0072340 A1* 3/2022 Nitta ......................... A62B 7/10
2022/0111233 A1* 4/2022 Peeters ..................... A62B 7/10

FOREIGN PATENT DOCUMENTS

JP 3189347 U * 3/2014
KR 20-2009-0011489 U 11/2009
KR 10-2014-0059969 A 5/2014
KR 10-2017-0130909 A 11/2017
KR 10-2273386 B1 7/2021
KR 102317939 B1 * 10/2021 ......... A41D 13/1161
KR 20210152667 A * 12/2021 ......... A41D 13/1107

* cited by examiner

*Primary Examiner* — Colin W Stuart
(74) *Attorney, Agent, or Firm* — Paratus Law Group, PLLC

(57) ABSTRACT

There is provided a mask guide including a guide positioned between a mask and a chin of a user to prevent the user's chin and an inner surface of the mask from coming in contact with each other. The guide includes a first guide disposed on the inner surface of the mask. The guide includes a second guide configured to be positioned on the user's chin and configured to be moved in accordance with movement of the user's chin.

5 Claims, 7 Drawing Sheets

MASK GUIDE

CROSS-REFERENCE TO PRIOR APPLICATION

This application claims priority to Korean Patent Application No. 10-2022-0015359 filed on Feb. 7, 2022, which is hereby incorporated by reference in its entirety.

BACKGROUND

The technology described in the specification relates to a mask guide, that is, a mask guide that prevents a mask from slipping down on the face of a user during use.

In Korean Utility Model Application Publication No. 20-2009-0011489 (published on Nov. 11, 2009, "Flows and the prevention wire mask which hands down"), a technique configured to be able to fix a portion that may easily slip down to fit the shape of a face although a mask may come off or may be blown and folded when wind is strong during exercise or outdoor activities by forming a wire at the upper portion of a main body because the main body is made of a fabric, ear strings are formed at both sides of the main body, a chin fastener is added under the main body, and flexible wires are fastened to ends except for the chin fastener has been disclosed.

In Korean Patent Application Publication No. 10-2014-0059969 (published on May 19, 2014, "A mask") in the related art, a technique including a face cover member that covers the front of a face, side cover members that cover ears and sides of a neck at sides of the face cover member, and an occiput cover member that covers the back of the head of a wearer at sides of the side cover members, in which the occiput cover member includes, together with the face cover member and the side cover members, an anti-slip second fixing member formed to surround the middle of a head, generating tension, and formed to come into close contact with the back of a head, and an anti-slip first fixing member formed to be able to be held on the upper portion of the back of the head of a wearer or the top of the head of a wearer to prevent the mask from slipping down from a head, has been disclosed.

In Korean Patent Application Publication No. 10-2017-0130909 (published on Nov. 29, 2017, "Mask with preventing flow down function") in the related art, a technique of a dustproof mask including a mask main body having a hollow dome shape and made of a filter fabric, a mask edge integrally formed with the main body at the edge of the mask main body, and band fixing portions attached to the left and right sides of the mask main body, in which a mask fixing member that can fix the mask main body on the ridge of a nose is disposed on the inner surface of the mask main body corresponding to the ridge of the nose of a wearer, so the mask main body can be prevented from slipping down by the mask fixing member has been disclosed.

In Korean Patent No. 10-2273386 (published on Jul. 5, 2021, "Dental mask with anti-flow and fogging function") in the related art, a technique in which a mask main body having a nose wire embedded in an upper end and having a rectangular shape, and ear bands for wearing a mask are provided, and a nose ridge contact cover having a rectangular shape with a predetermined width is further attached to the upper end portion of the inner side of the mask main body has been disclosed.

SUMMARY

The technique disclosed in the present specification has an objective of solving a problem that a mask slips down on a user wearing the mask due to conversation, etc.

In an embodiment, a mask guide is disclosed.

The mask guide disclosed in the present specification includes a guide 100 that is positioned between a mask 1 and the chin of a user to prevent contact between the user's chin and the inner surface of the mask 1.

The guide 100 may include a first guide 110 disposed on the inner surface of the mask 1.

The guide 100 may include a second guide 110 a second guide 120 positioned on the user's chin and being moved in accordance with movement of the user's chin.

The guide 100 includes a first guide 110 disposed on the inner surface of the mask 1 and a second guide 120 positioned on the user's chin and being moved in accordance with movement of the user's chin, in which as the user's chin moves, one surface of the second guide 120 slips in contact with the first guide 110.

The first guide 110 may include a suppressing part, of which one surface is disposed at a position facing the second guide 120 inside the mask 1 and a guide groove 112 formed in a lengthwise direction, in which the chin of a user moves, on the surface that is in contact with the second guide 120.

The second guide may include a contact part 121, of which one surface is supposed to be positioned on the chin of a user and another side faces the inner surface of the first guide 110, and a connecting part 122 that is a band made of an elastic material and of which one side is connected to the contact part 121 and another side is connected to the mask 1.

The second guide 120 may include a contact part 121, of which one surface is supposed to be positioned on the chin of a user and another side is positioned to face the inner surface of the first guide 110, and an adhesive part 123 that is disposed on the surface of the contact part 121, which comes in contact with the chin of a user, and is attached to the chin of a user.

The second guide may include a contact part 121, of which one surface is supposed to be positioned on the chin of a user and another side is positioned to face the inner surface of the first guide 110, a connecting part 122, of which one side is connected to the contact part 121, and a fixing part 124 that is disposed at another side of the connecting part 122 and is coupled to the mask 1.

The first guide includes a suppressing part 111, of which one surface is positioned to face the second guide 120 inside the mask 1 and a connecting extension disposed at both ends of the suppressing part and extending to both ends of the mask; and the second guide may include a contact part 121, of which one surface is supposed to be positioned on the chin of a user and another side is positioned to face the inner surface of the first guide 110, a connecting part 122 that is a band made of an elastic material and of which one side is connected to the contact part 121, and a fixing member 125 that can selectively fix an end of the extending part 113, another side of the connecting part 122, and an end of the mask 1 which overlap each other.

The mask guide disclosed in the present specification prevents the chin and the surface of a user from directly coming into contact with the inner surface of the mask 1 through the first guide 110 of the guide 100. That is, the mask guide disclosed in the present specification reduces the friction coefficient between the mask 1 and the skin tissues of a user through the suppressing part 111 of the first guide 110. As a result, the first guide 110 prevents the mask 1 from slipping down using the friction coefficient between the chin of a user and the mask 1 when the user wearing the mask 1 moves the chin in conversation, etc.

The mask guide disclosed in the present specification prevents the chin and the surface of a user from directly coming into contact with the inner surface of the mask 2 through the second guide 120 of the guide 100. That is, the friction coefficient between the mask 1 and the skin tissues of a user is reduced through the contact part 121 of the second guide 120. As a result, the first guide 120 is also moved when a user wearing the mask 1 moves his/her chin in conversation, etc., and prevents the mask 1 from slipping down using the friction coefficient between the chin of the user and the mask 1.

According to the mask guide disclosed in the present specification, as a user moves his/her chin, the second guide 120 rubs on the first guide 110 through the first guide 110 and the second guide 120 of the guide 100. In this case, surface fraction is absorbed and suppressed because the surfaces of the first guide 110 and the second guide 120 are slippery, thereby preventing the mask from slipping down.

The above description provides only a brief selective concept for the matters to be described in detail below. The description is not provided to limit main features or necessary features of the claims or limit the range of the claims.

DETAILED DESCRIPTION

Figure 1:
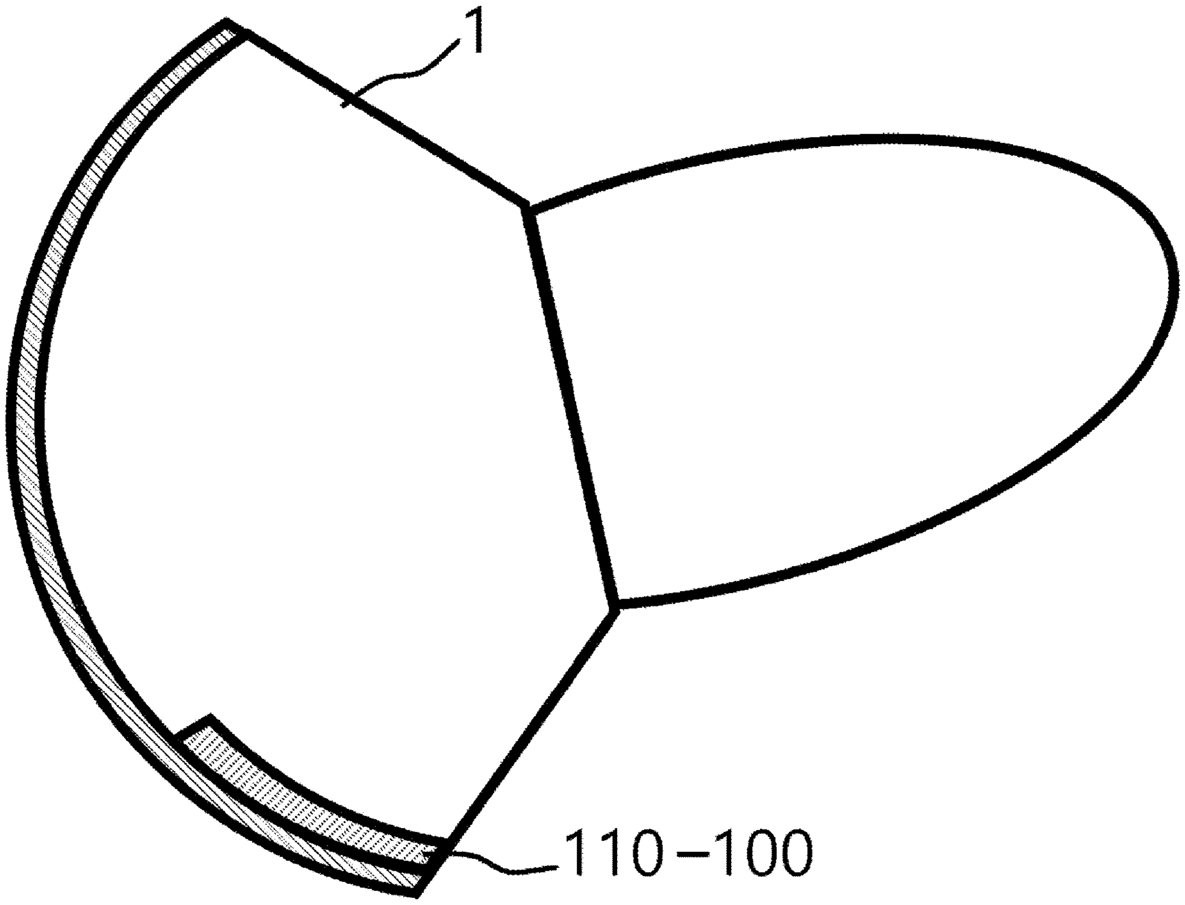
FIG. 1 is a view showing an embodiment of a mask guide disclosed in the present specification.

Hereafter, embodiments disclosed in the present specification are described in detail with reference to drawings. Unless clearly stated therein, similar reference numerals in drawings indicate similar components. Exemplary embodiments described in detail in the detailed description, drawings, and claims are not for limiting, other embodiments may be used, and other modifications are possible unless they depart from the technical spirit or range disclosed herein. It would be easily understood that those skilled in the art can arrange, configure, combine, and design components of the present disclosure, that is, components generally described herein and shown in drawings in various ways and all of these are clearly designed and form a portion of the present disclosure. In the drawings, a width, a length, a thickness, or a shape of components may be exaggerated to clearly show several layers (films), regions, and shapes.

When a component is "disposed" at another component, it may include not only the case in which the component is directly disposed at the another component, but also the case in which an additional component is interposed between the components.

When a component is "provided" at another component, it may include not only the case in which the component is directly provided at the another component, but also the case in which an additional component is interposed between the components.

The description in the disclosed technique is only embodiments for structural and functional description, so the scope of a right of the disclosed technique should not be construed as being limited by the embodiments described herein. That is, embodiments may be changed and modified in various ways, so the scope of a right of the disclosed technique should be understood as including equivalents that can achieve the spirit of the present disclosure.

Singular forms should be understood as including plural forms unless the context clearly indicates otherwise and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms used herein have the same meaning as commonly understood by those skilled in the art to which the present disclosure belongs. It will be further understood that terms defined in dictionaries that are commonly used should be interpreted as having meanings that are consistent with their meanings in the context of the relevant art and will not be interpreted in an idealized or overly formal sense unless expressly so defined herein.

Figure 2:
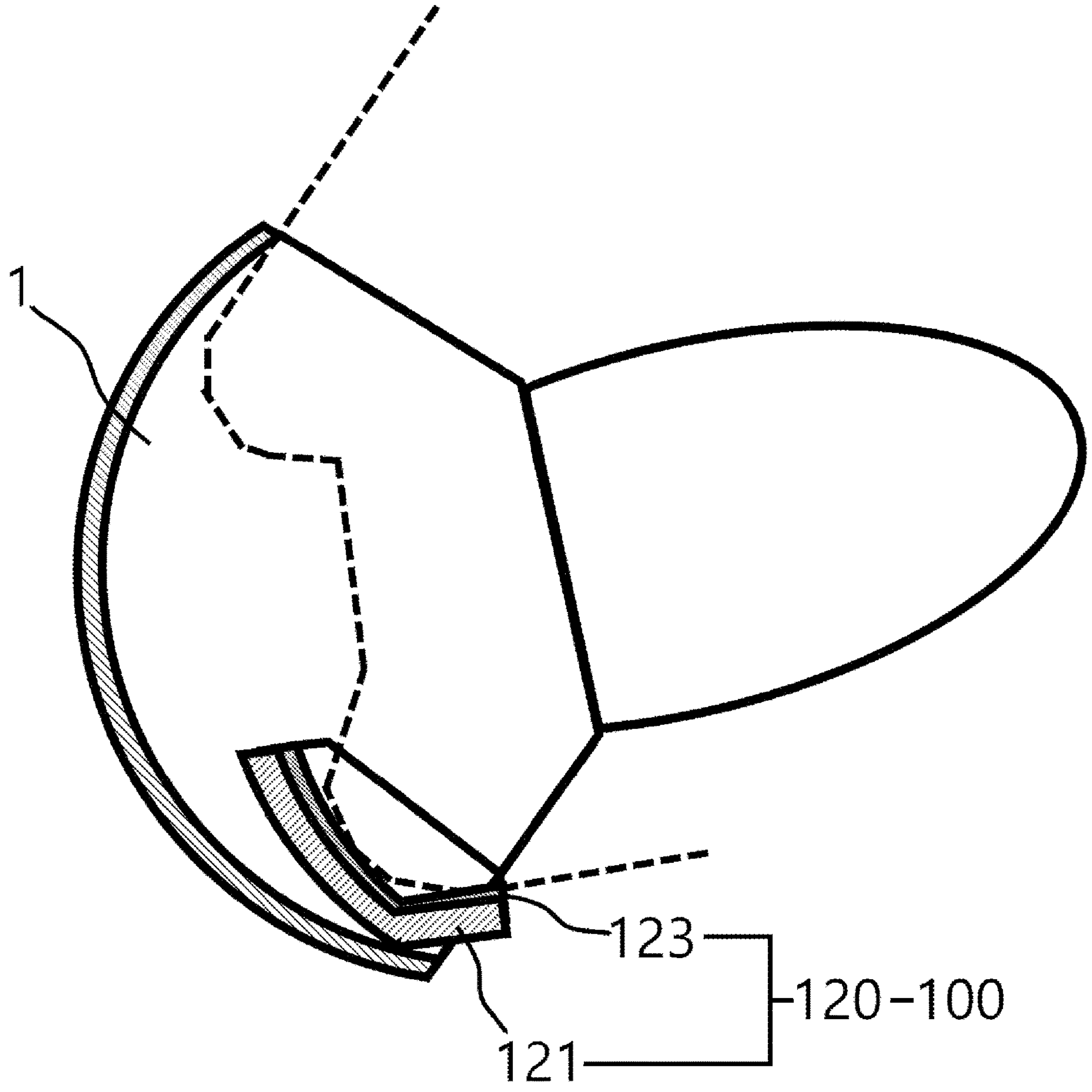
FIG. 2 is a view showing another embodiment of a mask guide disclosed in the present specification.
Figure 3:
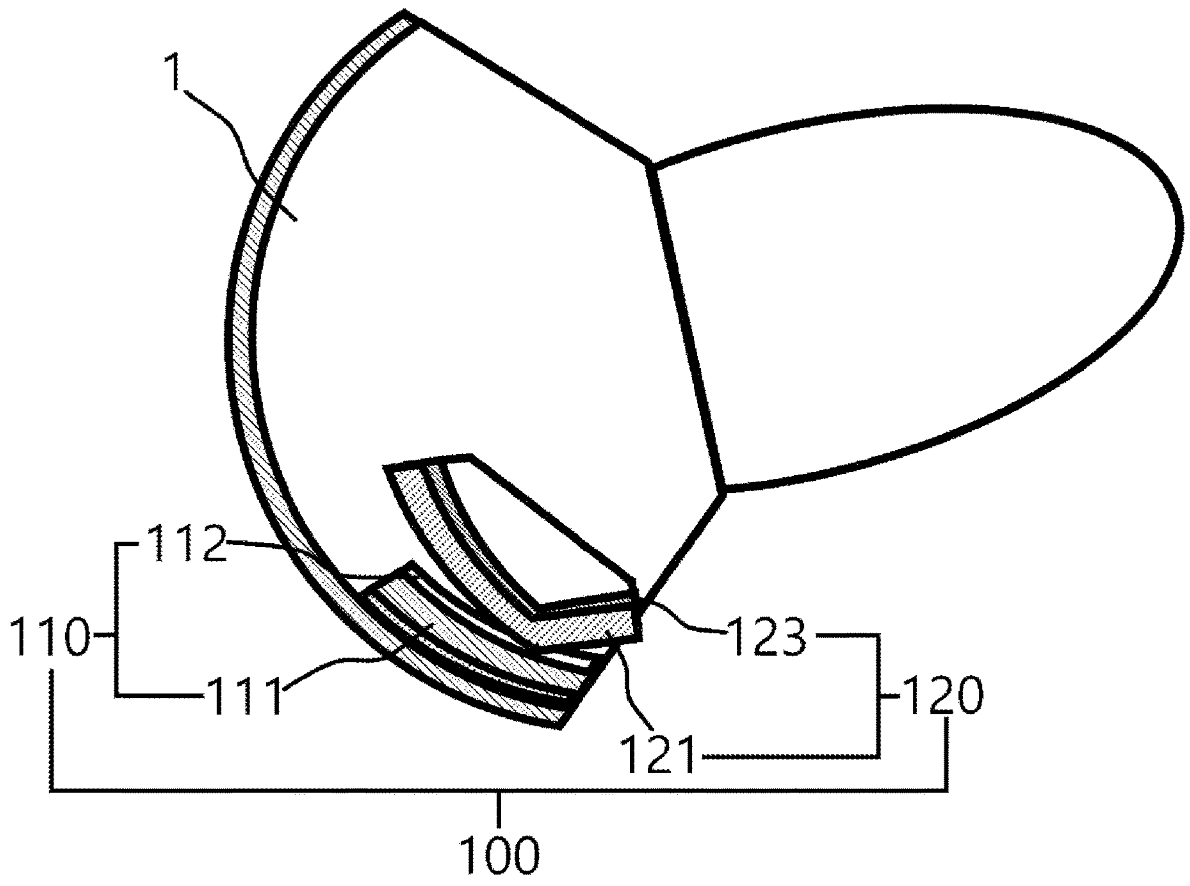
FIG. 3 is a view showing another embodiment of a mask guide disclosed in the present specification.
Figure 4:
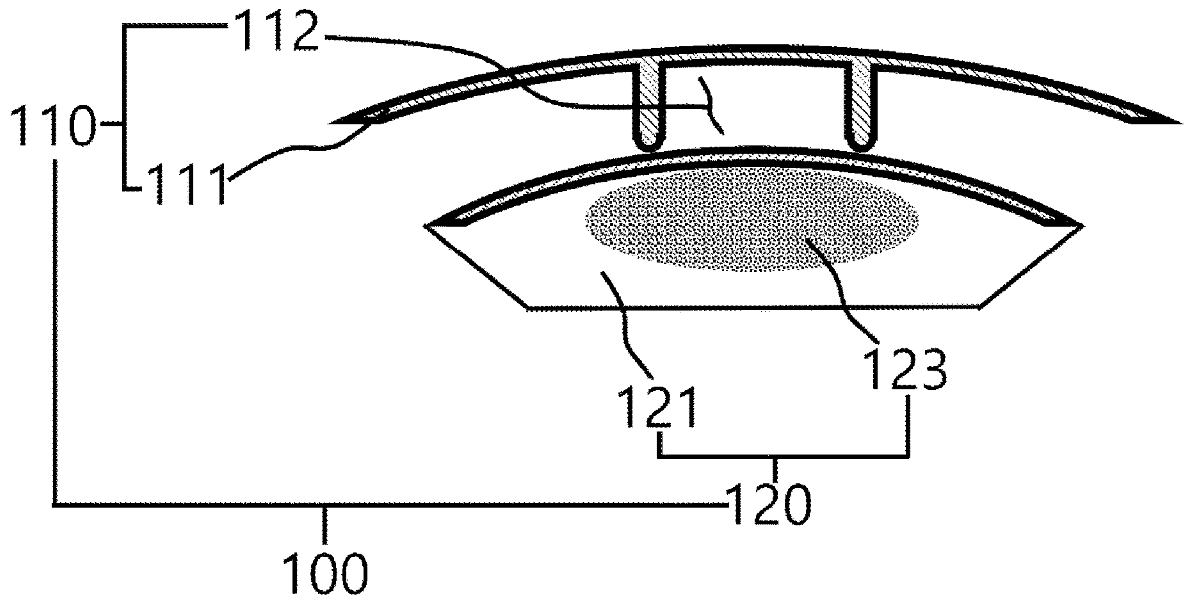
FIG. 4 is a view showing an example of a guide disclosed in the present specification.
Figure 5:
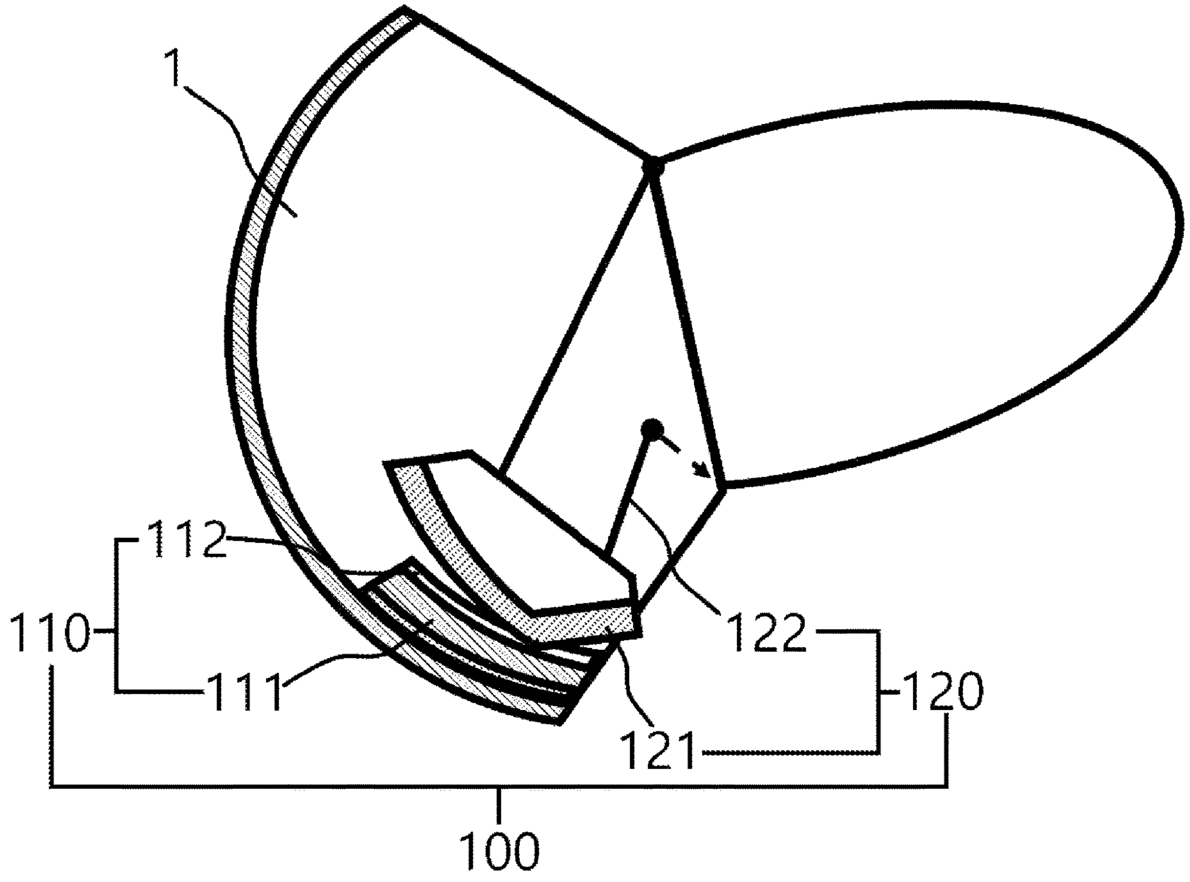
FIG. 5 is a view showing a first guide and a second guide disclosed in the present specification.
Figure 6:
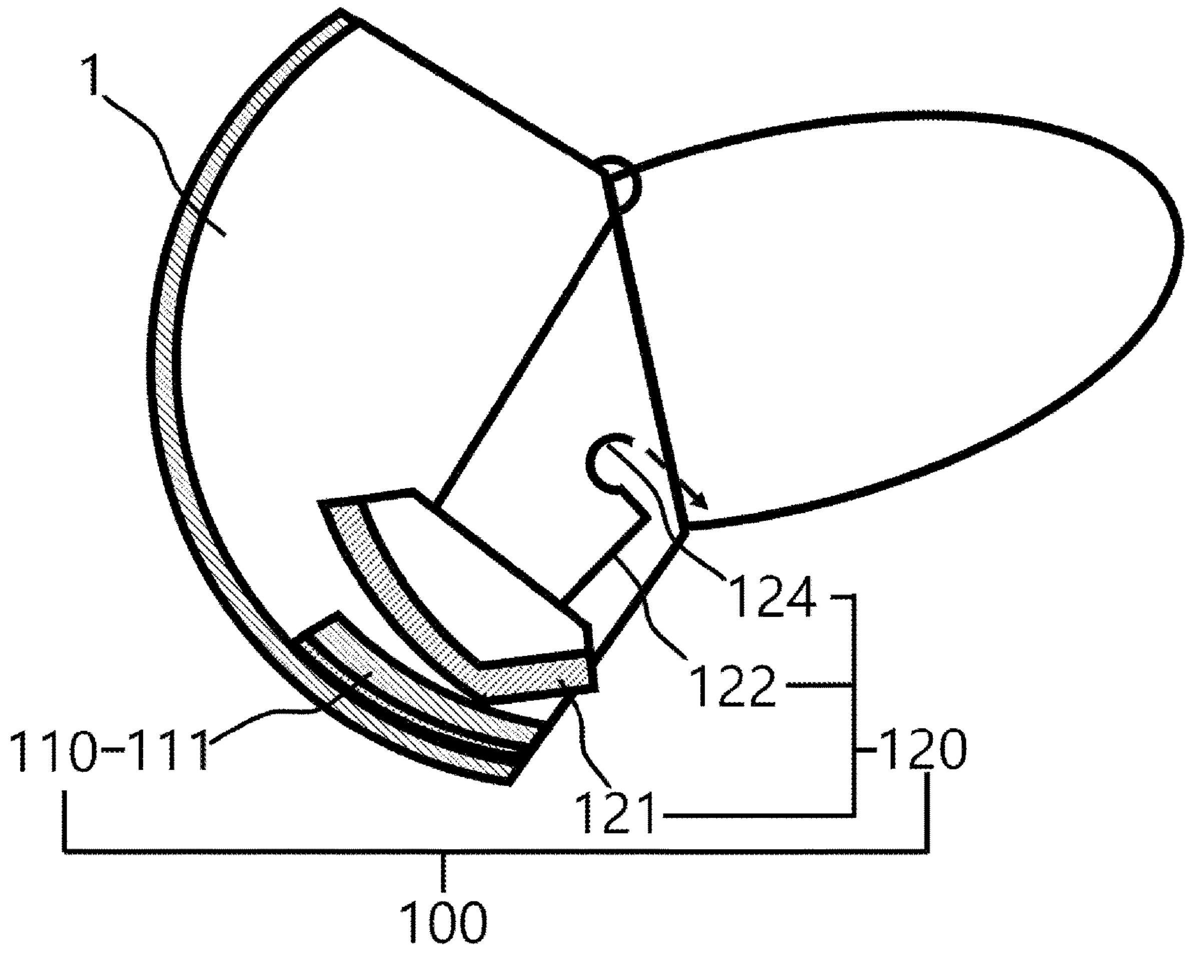
FIG. 6 is a view showing another example of a guide disclosed in the present specification.
Figure 7:
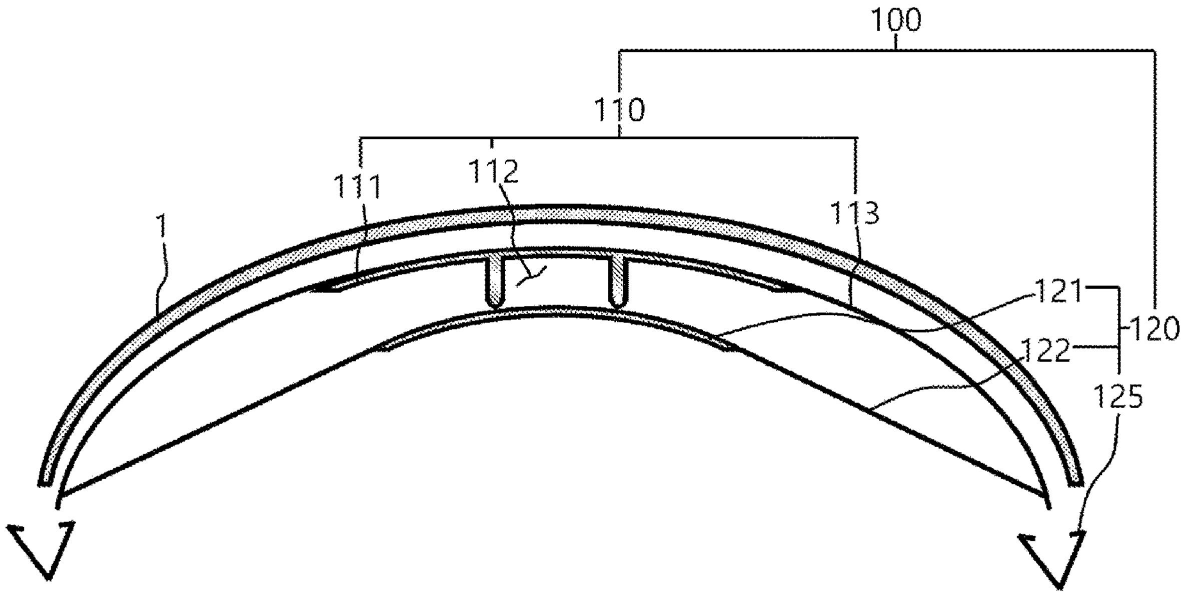
FIG. 7 is a view showing another example of a guide disclosed in the present specification.
Figure 8:
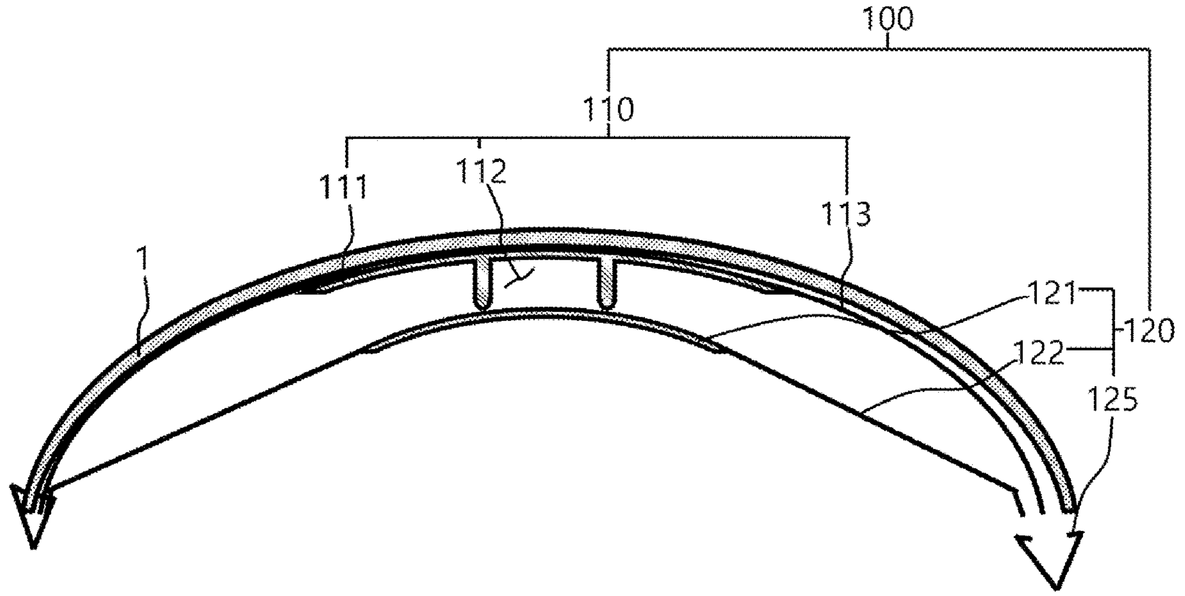
FIG. 8 is a view showing another example of a guide disclosed in the present specification.

FIG. 1 of the accompanying drawings of the present specification is a view showing an embodiment of a mask guide disclosed in the present specification. FIG. 2 is a view showing another embodiment of a mask guide disclosed in the present specification. FIG. 3 is a view showing another embodiment of a mask guide disclosed in the present specification. FIG. 4 is a view showing an example of a guide disclosed in the present specification. FIG. 5 is a view showing a first guide and a second guide disclosed in the present specification. FIG. 6 is a view showing another example of a guide disclosed in the present specification. FIG. 7 is a view showing another example of a guide disclosed in the present specification. FIG. 8 is a view showing another example of a guide disclosed in the present specification.

A mask guide disclosed in the present specification referring to the accompanying drawings substantially includes a guide 100.

The guide 100 may selectively include a first guide 110.

The guide 100 may selectively include a second guide 120.

The guide 100 may selectively include the first guide 110 and the second guide 120.

The first guide 110 may selectively include a suppressing part 111 and a guide groove 112.

The second guide 120 may selectively include a contact part 121 and a connecting part 122.

The second guide 120 may selectively include the contact part 121 and an adhesive part 123.

The second guide 120 may selectively include the contact part 121, the connecting part 122, and a fixing part 124.

The first guide 110 of the mask guide disclosed in the present specification may include the suppressing part 111 and an extension 113, and the second guide 120 may selectively include the contact part 121, the connecting part 122, and a clipping member 125.

Hereafter, the present disclosure is described in more detail with reference to the accompanying drawings of the present specification.

The mask guide disclosed in the present specification referring to the accompanying drawings includes a guide 100 that is positioned between a mask 1 and the chin of a user to prevent contact between the user's chin and the inner surface of the mask 1.

The guide 100 according to an embodiment may include a first guide 110.

As an example referring to FIG. 1, the first guide 110 may be disposed on the inner surface of the mask 1. In more detail, the first guide 110 may include a suppressing part 111 provided in a rectangular plate shape. A common adhesive may be applied to one surface of the suppressing part 111. The suppressing part 111 may be coupled to a lower end of the inner surface of the mask 1 through the adhesive. The suppressing part 111 is coupled at a position where it can come into contact with the chin of a user of the mask 1. The surface of the suppressing part 111 may be slippery. The suppressing part 111 may be made of a common plastic material such that the surface is slippery, so the surface may not be rough. That is, the suppressing part 111 is disposed at a position where one surface thereof faces the chin of a user.

The first guide 110 including the suppressing part 111 described above is positioned between the chin of a user wearing the mask 1 and the mask 1. The first guide 110 prevents direct contact between the chin of a user and the inner surface that is the rough surface of the mask 1. That is, the first guide 110 reduces the friction coefficient between the mask 1 and the skin tissues of a user through the suppressing part 111. As a result, the first guide 110 prevents the mask 1 from slipping down using the friction coefficient between the chin of a user and the mask 1 when the user wearing the mask 1 moves the chin in conversation, etc.

Meanwhile, the suppressing part 111 may be a film and may be integrally formed with the mask 1 by sewing rather than the adhesive.

As another example referring to FIG. 4, the first guide 110 includes the suppressing part 111 described in the above example and may further include a guide groove 112. The guide groove 112 is a groove formed in the lengthwise direction, in which the chin of a user moves, on the surface of the suppressing part 111 that is in contact with the second guide 120. The contact part 121 of the second guide 120 is partially inserted in the guide groove 112 and a protruding portion forming the groove guides movement in contact with the surface of the contact part 121, whereby point contact is induced rather than surface contact.

As another example referring to FIG. 7, the first guide 110 includes the suppressing part 111 described in the above example and may further include an extension 113. The extension 113 may be a common band having elasticity. The extension 113 may be provided at each of both ends of the suppressing part 111. The extension 113 may have one end disposed at a side of the suppressing part 111 and another end extending to the end of the mask 1.

The guide 100 according to another embodiment may include a second guide 120. The second guide 120 may be disposed to correspond to the chin of a user and may be moved in accordance with movement of the user's chin.

As an example referring to FIG. 2, the second guide 120 may include a contact part 121 and an adhesive part 123.

The contact part 121 may be provided in a shape surrounding the chin of a user. The contact part 121 may be positioned to surround the chin of a user of the mask 1. The surface of the contact part 121 may be slippery. The contact part 121 may be made of a plastic material such that the surface is not rough.

The adhesive part 123 may be a common adhesive. The adhesive part 123 may be applied to the inner surface of the contact part 121. The adhesive part 123 enables the contact part 121 to be attached to the chin of a user.

The second guide 120 including the contact part 121 described above is positioned between the chin of a user wearing the mask 1 and the mask 1. The second guide 120 prevents direct contact between the chin of a user and the inner surface that is the rough surface of the mask 1. That is, the second guide 120 reduces the friction coefficient between the mask 1 and the skin tissues of a user through the contact part 121. As a result, the first guide 120 is also moved when a user wearing the mask 1 moves his/her chin in conversation, etc., and prevents the mask 1 from slipping down using the friction coefficient between the chin of the user and the mask 1.

Meanwhile, the adhesive part 123 may be common silicon or a component with a low adhesive strength that can be absorbed or attached to skin tissues of a person.

As another example, the second guide 120 may include the contact part 121 and a connecting part 122.

The contact part 121, as in the example described above, may be provided in a shape surrounding the chin of a user. The contact part 121 may be positioned to surround the chin of a user of the mask 1. The surface of the contact part 121 may be slippery. The contact part 121 may be made of a plastic material such that the surface is not rough.

The connecting part 122 may be a band made of an elastic material. The connecting part 122 may be connected at both sides to the contact part 121 to be hung on the ears of a user. It would be reasonable that the connecting part 122 is provided at each of both sides of the contact part 121.

Meanwhile, the connecting part 122, as in FIG. 5, has one side connected to the contact part 121 and another end tied to a band of the mask, thereby being able to connect the contact part 121 and the mask 1.

According to the second guide 120 including the contact part 121 and the connecting part 122 described in above another example, a user covers his/her chin using the contact part 121 and hangs the connecting parts 122 on the ears in use. The connecting parts 122 are extended when they are hung on the ears of a user, and then bring the contact part 121 into close contact with the chin of the user using a restoring force.

As another example referring to FIG. 5 or FIG. 6, the second guide 120 may include a contact part 121, a connecting part 122, and a fixing part 124.

The contact part 121, as in the example described above, may be provided in a shape surrounding the chin of a user. The contact part 121 may be positioned to surround the chin of a user of the mask 1. The surface of the contact part 121 may be slippery. The contact part 121 may be made of a plastic material such that the surface is not rough.

The connecting part 122, as in the example described above, may be a band made of an elastic material. The connecting part 122 may be connected at a side to a contact part 121. It would be reasonable that the connecting part 122 is provided at each of both sides of the contact part 121.

The fixing part 124 may be a common ring. The fixing part 124 is coupled to another side of the connecting part 122. The fixing part 124 is hung on the band of the mask through the ring, thereby connecting the contact part 121 to the mask 1.

According to the second guide 120 including the contact part 121, the connecting part 122, and the fixing part 124 described above in another example, a user covers his/her chin using the contact part 121 and hangs the fixing part 124 on the band of the mask 1 in use. The fixing part 124 is extended when it is hung on the band of the mask 1, and then brings the contact part 121 into close contact with the chin of a user using a restoring force. The second guide 120 can be easily attached/detached to/from the mask 1 through the fixing part 124.

Meanwhile, the fixing part 124 may be a common hook or a pin made of a material that is easily bent.

Further, the fixing part 124 may integrate an end of the connecting part 122 and any one side of the mask through ultrasonic welding or an adhesive.

As another example referring to FIG. 7, the second guide 120 may include a contact part 121, a connecting part 122, and a clipping member 125.

The contact part 121 is made of a material having a slippery surface and may be a film having a size that can cover the chin of a user. The contact part 121 may be positioned to surround the chin of a user of the mask 1.

The connecting part 122 may be a band made of an elastic material. The connecting part 122 may be connected at a side to a contact part 121. It would be reasonable that the connecting part 122 is provided at each of both sides of the contact part 121.

The clipping member 125 is made of soft metal in a 'ㅅ'-shaped cross section and may be formed such that protruding pins are formed by bending both ends inward. The clipping member 125 applies pressure with another side of the connecting part 122 and the edge of the mask 1 in contact with each other, whereby the protruding pins bending inward fix the end of the connecting part 122 and the edge of the mask 1.

According to the second guide 120 including the contact part 121, the connecting part 122, and the clipping member 125 described in above another example, a user covers his/her chin using the contact part 121 and fixes the mask 1 and the connecting part 122 through the clipping member 125 in use. The connecting part 122 is extended when it is hung on the band of the mask 1, and then brings the contact part 121 into close contact with the chin of a user using a restoring force. The second guide 120 can be easily attached/detached to/from the mask 1 through the clipping member 125.

Meanwhile, the clipping member 125 may be a common clip or a pin made of a material that is easily bent.

A guide 100 according to another embodiment referring to FIGS. 3 to 8 may include a first guide 110 and a second guide 120.

Hereafter, the guide 100 according to an example referring to FIG. 5 is described.

The first guide 110, as in an embodiment described above, may be disposed on the inner surface of the mask 1. In more detail, the first guide 110 may include a suppressing part 111 provided in a rectangular plate shape. A common adhesive may be applied to one surface of the suppressing part 111. The suppressing part 111 may be coupled to a lower end of the inner surface of the mask 1 through the adhesive. The suppressing part 111 is coupled at a position where it can come into contact with the chin of a user of the mask 1. The surface of the suppressing part 111 may be slippery. The suppressing part 111 may be made of a common plastic material such that the surface is slippery, so the surface may not be rough. That is, the uppressing part 111 is disposed at a position where one surface thereof faces the chin of a user.

The second guide 120, as in an embodiment described above, may include a contact part 121 and a connecting part 122.

The contact part 121 may be provided in a shape surrounding the chin of a user. The contact part 121 may be positioned to surround the chin of a user of the mask 1. The surface of the contact part 121 may be slippery. The contact part 121 may be made of a plastic material such that the surface is not rough.

The connecting part 122 may be a band made of an elastic material. The connecting part 122 has one side connected to the contact part 121 and another end tied to a band of the mask, thereby being able to connect the contact part 121 and the mask 1.

That is, the second guide includes a contact part 121, of which one surface is supposed to be positioned on the chin of a user and another side is positioned to face the inner surface of the first guide 110, and a connecting part 122 that is a band made of an elastic material and of which one side is connected to the contact part 121 and another side is connected to the mask 1.

Meanwhile, the connecting part 122 may be a band made of an elastic material. The connecting part 122 may be connected at both sides to the contact part 121 to be hung on the ears of a user. It would be reasonable that the connecting part 122 is provided at each of both sides of the contact part 121.

According to the guide 100 including the first guide 110 and the second guide 120 described above, as a user moves his/her chin, the second guide 120 rubs on the first guide 110. In this case, surface fraction is absorbed and suppressed because the surfaces of the first guide 110 and the second guide 120 are slippery, thereby preventing the mask 1 from slipping down.

Meanwhile, the first guide 110 may include a guide groove 112 formed in a lengthwise direction, in which the chin of a user moves, on the surface, which is in contact with the second guide 120, of the suppressing part 111, of which one surface is disposed at a position facing the second guide 120 inside the mask 1. The contact part 121 of the second guide 120 is partially inserted in the guide groove 112 and a protruding portion forming the groove guides movement in contact with the surface of the contact part 121, whereby point contact is induced rather than surface contact.

Hereafter, the guide 100 according to an example referring to FIG. 3 or FIG. 4 is described.

The first guide 110, as in an embodiment described above, may be disposed on the inner surface of the mask 1. In more detail, the first guide 110 may include a suppressing part 111 that is a rectangular plate-shaped film. The suppressing part 111 may be integrated with the mask 1 by common sewing. The suppressing part 111 may be coupled to a lower end of the inner surface of the mask 1. The suppressing part 111 is coupled at a position where it can come into contact with the chin of a user of the mask 1. That is, the suppressing part 111 is disposed at a position where one surface thereof faces the chin of a user.

The second guide 120 may include a contact part 121 and an adhesive part 123.

The contact part 121 may be a common film having a slippery surface having a size that can cover the chin of a user. The contact part 121 may be positioned to surround the chin of a user of the mask 1.

The adhesive part 123 may be a common adhesive. The adhesive part 123 may be applied to the inner surface of the contact part 121. The adhesive part 123 enables the contact part 121 to be attached to the chin of a user.

That is, the second guide 120 may include a contact part 121, of which one surface is supposed to be positioned on the chin of a user and another side is positioned to face the inner surface of the first guide 110, and an adhesive part 123 that is disposed on the surface of the contact part 121, which comes in contact with the chin of a user, and is attached to the chin of a user.

According to the guide 100 including the first guide 110 and the second guide 120 which has the second guide 120 and the first guide 110 described above, the contact part 121 is positioned on the chin of a user by the connecting part 122. The second guide 120 rubs on the first guide 110 as the chin of a user moves. In this case, surface fraction is absorbed and suppressed because the surfaces of the first guide 110 and the second guide 120 are slippery, thereby preventing the mask 1 from slipping down.

Meanwhile, the first guide 110 may include a guide groove 112 formed in a lengthwise direction, in which the chin of a user moves, on the surface, which is in contact with the second guide 120, of the suppressing part, of which one surface is disposed at a position facing the second guide 120 inside the mask 1. The contact part 121 of the second guide 120 is partially inserted in the guide groove 112 and a protruding portion forming the groove guides movement in contact with the surface of the contact part 121, whereby point contact is induced rather than surface contact.

Hereafter, the guide 100 according to another example referring to FIG. 6 is described.

The first guide 110, as in an embodiment described above, may be disposed on the inner surface of the mask 1. In more detail, the first guide 110 may include a suppressing part 111 provided in a rectangular plate shape. A common adhesive may be applied to one surface of the suppressing part 111. The suppressing part 111 may be coupled to a lower end of the inner surface of the mask 1 through the adhesive. The suppressing part 111 is coupled at a position where it can come into contact with the chin of a user of the mask 1. The surface of the suppressing part 111 may be slippery.

The suppressing part 111 may be made of a common plastic material such that the surface is slippery, so the surface may not be rough. That is, the suppressing part 111 is disposed at a position where one surface thereof faces the chin of a user.

The second guide 120, as in an embodiment described above, may include a contact part 121, a connecting part 122, and a fixing part 124.

The contact part 121 may be provided in a shape surrounding the chin of a user. The contact part 121 may be positioned to surround the chin of a user of the mask 1. The surface of the contact part 121 may be slippery. The contact part 121 may be made of a plastic material such that the surface is not rough.

The connecting part 122 may be a band made of an elastic material. The connecting part 122 has one side connected to the contact part 121 and another end tied to a band of the mask, thereby being able to connect the contact part 121 and the mask 1.

The fixing part 124 may be a common hook. The fixing part 124 may be disposed at another side of the connecting part 122. The fixing part 124 may be coupled to the band of the mask through the hook. The fixing part 124 connects the mask 1 and the connecting part 122 through the hook such that the contact part 121 is integrated with the mask 1.

That is, the second guide includes a contact part 121, of which one surface is supposed to be positioned on the chin of a user and another side is positioned to face the inner surface of the first guide 110, a connecting part 122, of which one side is connected to the contact part 121, and a fixing part 124 that is disposed at another side of the connecting part 122 and is coupled to the mask 1. According to the guide 100 including the second guide, which includes the contact part 121, the connecting part 122, and the fixing part 124 described in the above example, and the first guide 110, the connecting part 122 can be selectively coupled to and separated from the mask 1 though the fixing part 124. The connecting part 122 connected to the mask 1 through the fixing part 124 enables the contact part 121 to be positioned on the chin of a user. The second guide 120 rubs on the first guide 110 as the chin of a user moves. In this case, surface fraction is absorbed and suppressed because the surfaces of the first guide 110 and the second guide 120 are slippery, thereby preventing the mask 1 from slipping down.

Meanwhile, the first guide 110 may include a guide groove 112 formed in a lengthwise direction, in which the chin of a user moves, on the surface, which is in contact with the second guide 120, of the suppressing part, of which one surface is disposed at a position facing the second guide 120 inside the mask 1. The contact part 121 of the second guide 120 is partially inserted in the guide groove 112 and a protruding portion forming the groove guides movement in contact with the surface of the contact part 121, whereby point contact is induced rather than surface contact.

Hereafter, the guide 100 according to an example referring to FIG. 7 is described.

The first guide 110, as in an embodiment described above, may include a suppressing part 111 and an extending part 113.

The suppressing part 111 may be disposed on the inner surface of the mask 1. In more detail, the suppressing part 111 may be provided in a rectangular plate shape. The suppressing part 111 may be made of a common plastic material such that the surface is slippery, so the surface may not be rough. That is, the suppressing part 111 is disposed at a position where one surface thereof faces the chin of a user.

The extension 113 may be a common band having elasticity. The extension 113 may be provided at each of both ends of the suppressing part 111. The extension 113 may have one end disposed at a side of the suppressing part 111 and another end extending to the end of the mask 1.

The second guide 120 may include the contact part 121, the connecting part 122, and the clipping member 125 described in an embodiment described above.

The contact part 121 is made of a material having a slippery surface and may have a size and a shape that can cover the chin of a user. The contact part 121 may be positioned to surround the chin of a user of the mask 1.

The connecting part 122 may be a band made of an elastic material. The connecting part 122 may be connected at a side to a contact part 121. It would be reasonable that the connecting part 122 is provided at each of both sides of the contact part 121.

The clipping member 125 is made of soft metal in a 'ㅅ'-shaped cross section and may be formed such that protruding pins are formed by bending both ends inward. The clipping member 125 applies pressure with another side of the connecting part 122 and the edge of the mask 1 in contact with each other, whereby the protruding pins bending inward fix the end of the connecting part 122 and the edge of the mask 1.

That is, the second guide includes a contact part 121, of which one surface is supposed to be positioned on the chin of a user and another side is positioned to face the inner surface of the first guide 110, a connecting part 122 that is a band made of an elastic material and of which one side is connected to the contact part 121, and a fixing member 125 that can selectively fix an end of the extending part 113, another side of the connecting part 122, and an end of the mask 1 which overlap each other.

According to the guide 100 including the second guide, which includes the contact part 121, the connecting part 122, and the clipping member 125 described in the another example described above, and the first guide 110, the connecting part 122 and the extension 113 can be selectively coupled to and separated from the mask 1 though the clipping member 125. The connecting part 122 connected to the mask 1 through the clipping member 125 enables the contact part 121 to be positioned on the chin of a user. The extension 113 connected to the mask 1 through the clipping member 125 maintains the position of the suppressing part 111 facing the contact part 121. A user covers his/her chin using the contact part 111 and fixes the mask 1, the connecting part 122, and the extension 113 through the clipping member 125 in use. The connecting part 122 is extended when it is fixed to the mask 1 or the extension 113, and then brings the contact part 121 into close contact with the chin of a user using a restoring force. The second guide 120 can be easily attached/detached to/from the mask 1 through the clipping member 125. The second guide 120 rubs on the first guide 110 as the chin of a user moves. In this case, surface fraction is absorbed and suppressed because the surfaces of the first guide 110 and the second guide 120 are slippery, thereby preventing the mask 1 from slipping down.

Meanwhile, the clipping member 125 may be a common clip or a pin made of a material that is easily bent.

Meanwhile, as shown as an example in FIG. 8, an end of the extension 113 may be connected to the connecting part 122, for example, by ultrasonic welding, an adhesive, or sewing. In this case, a user can fix the mask 1 and the connecting part 122 through the clipping member 125 in use.

Various embodiments of the present disclosure were described above for examples and it would be understood that various modifications may exist without departing from the range and spirit of the present disclosure. Further, the various embodiment disclosed herein do not limit the spirit of the present disclosure, and real spirit and range may be proposed by the following claims.

What is claimed is:

1. A mask guide comprising a guide configured to be positioned between a mask and a chin of a user to prevent the user's chin and an inner surface of the mask from coming in contact with each other, wherein the guide includes:

a first guide disposed on the inner surface of the mask; and a second guide configured to be positioned on the user's chin and configured to move in accordance with movement of the user's chin, and when in use, as the user's chin moves, one surface of the second guide slips in contact with the first guide, wherein the second guide includes:

a contact part, of which one surface is configured to be positioned on the user's chin and another side is positioned to face an inner surface of the first guide; and a connecting part that is a band made of an elastic material and of which one side connected to the contact part and another side is connected to the mask.

2. The mask guide of claim 1, wherein the first guide includes:

a suppressing part, of which one surface is positioned to face the second guide inside the mask; and a guide groove formed in a lengthwise direction, in which the user's chin moves when in use, on a surface being in contact with the second guide.

3. The mask guide of claim 1, wherein the second guide further includes:

an adhesive part disposed on an inner surface of the contact part, the inner surface being configured to contact the user's chin, the adhesive part being configured to attach the contact part to the user's chin.

4. A mask guide comprising a guide configured to be positioned between a mask and a chin of a user to prevent the user's chin and an inner surface of the mask from coming in contact with each other, wherein the guide includes:

a first guide disposed on the inner surface of the mask; and a second guide configured to be positioned on the user's chin and configured to move in accordance with movement of the user's chin, and when in use, as the user's chin moves, one surface of the second guide slips in contact with the first guide, wherein the first guide includes:

a suppressing part, of which one surface is positioned to face the second guide inside the mask; and a connecting extension disposed at both ends of the suppressing part and extending to both ends of the mask, and the second guide includes:

a contact part, of which one surface is configured to be positioned on the user's chin and another side is positioned to face an inner surface of the first guide;

a connecting part that is a band made of an elastic material and is connected to the contact part; and a clipping member comprising a clip or a pin and configured to selectively connect an end of one of the connecting extensions, another side of the connecting part, and an end of the mask that overlap each other.

5. A mask guide comprising a guide configured to be positioned between a mask and a chin of a user to prevent the user's chin and an inner surface of the mask from coming in contact with each other, wherein the guide includes:

a first guide disposed on the inner surface of the mask; and a second guide configured to be positioned on the user's chin and configured to move in accordance with movement of the user's chin, and when in use, as the user's chin moves, one surface of the second guide slips in contact with the first guide, wherein the second guide includes:

a contact part, of which one surface is configured to be positioned on the user's chin and another side is positioned to face an inner surface of the first guide;

a connecting part that is a band made of an elastic material and is connected to the contact part; and a fixing part that is disposed at another side of the connecting part and coupled to the mask.

* * * * *